(12) United States Patent
Ford

(10) Patent No.: US 8,865,006 B2
(45) Date of Patent: Oct. 21, 2014

(54) CONCRETE WASHOUT SEPARATION SYSTEM

(76) Inventor: Jeff Ford, Elkhorn, NE (US)

( * ) Notice: Subject to any disclaimer, the term of this patent is extended or adjusted under 35 U.S.C. 154(b) by 297 days.

(21) Appl. No.: 13/585,649

(22) Filed: Aug. 14, 2012

(65) Prior Publication Data

US 2013/0043196 A1 Feb. 21, 2013

Related U.S. Application Data

(60) Provisional application No. 61/523,455, filed on Aug. 15, 2011.

(51) Int. Cl.
*B01D 21/02* (2006.01)
*B01D 21/00* (2006.01)
*C02F 103/12* (2006.01)
*C02F 1/00* (2006.01)

(52) U.S. Cl.
CPC ......... *B01D 21/0003* (2013.01); *C02F 2103/12* (2013.01); *C02F 2001/007* (2013.01); *B01D 21/0033* (2013.01); *B01D 21/0042* (2013.01)
USPC ........... 210/801; 210/804; 210/255; 210/522; 210/532.1

(58) Field of Classification Search
CPC ............. B01D 21/003; B01D 21/0033; B01D 21/0042; B01D 21/0066; C02F 2001/007; C02F 2103/12

USPC ................. 210/800, 801, 804, 255, 521, 522, 210/532.1

See application file for complete search history.

(56) References Cited

U.S. PATENT DOCUMENTS

| | | | | |
|---|---|---|---|---|
| 3,221,889 A | * | 12/1965 | Hirsch | 210/532.1 |
| 4,536,286 A | * | 8/1985 | Nugent | 210/521 |
| 5,996,604 A | * | 12/1999 | Doelle et al. | 210/521 |
| 6,592,753 B2 | * | 7/2003 | Lee | 210/522 |
| 7,438,803 B1 | * | 10/2008 | Allen | 210/532.1 |
| 8,168,073 B2 | * | 5/2012 | Ng et al. | 210/521 |
| 2007/0284312 A1 | * | 12/2007 | Lough | 210/209 |

FOREIGN PATENT DOCUMENTS

GB 2467005 * 7/2010

* cited by examiner

*Primary Examiner* — Christopher Upton
(74) *Attorney, Agent, or Firm* — Matt Catlett

(57) ABSTRACT

The invention pertains generally to waste management and debris removal, and more particularly to systems and methods for separating and recovering the water and solids from a volume of concrete washout following the washing out of concrete mixer trucks and other concrete mixing and delivery equipment.

3 Claims, 2 Drawing Sheets

CONCRETE WASHOUT SEPARATION SYSTEM

CROSS REFERENCE TO RELATED APPLICATIONS

This application claims priority to, and the benefit of, U.S. Application No. 61/523,455, filed Aug. 15, 2011, the specification of which is hereby incorporated by reference in its entirety.

FIELD OF THE INVENTION

The invention pertains generally to waste management and debris removal, and more particularly to system and method for separating the water and solids from a volume of concrete washout following the washing out of concrete mixer trucks and other concrete mixing and delivery equipment.

BACKGROUND OF THE INVENTION

Concrete is used extensively in the construction industry and is typically carried to job sites in transit mixer trucks, or on-site mixers, and may be moved at a work site to a point-of-use by concrete pump trucks. When pumping or pouring is complete, a small amount of concrete may remain in the truck, while concrete residues remain on portions of both vehicle mounted and manually operated equipment. Failure to quickly remove the concrete residues allows the concrete to harden thereby complicating the cleanup process and in some cases damaging the equipment. The mixer and pump portions of the truck along with concrete finishing tools must be washed off at the job site after pouring or pumping concrete to allow continued use of the equipment.

At present, concrete residue removal and cleanup is typically accomplished at a temporary disposal location, generally comprising a pit dug in the ground which may in some cases be covered with plastic sheet and surrounded by hay bales. On a concrete pump truck, a plug is removed from the bottom of the concrete pump which allows waste concrete to drain into the disposal pit. The concrete carrier portions are then washed, such as with a hose, to remove concrete residues. A similar operation is performed for transit mixer trucks, and other equipment for handling concrete.

Concrete itself, once hardened, is inert and harmless to the environment. However, the water used to cure concrete, or to clean equipment used to deliver and place concrete, can raise the pH level of surrounding waters and increase the heavy metal content, either of which can in some cases harm living organisms. Therefore, primarily due to environmental concerns and requirements, the concrete is commonly drained into a pit covered with a waterproof sheet, such as a plastic sheet. When the waste concrete materials harden, they are typically removed from the pit and transported to a permanent disposal site. The difficulty with such an approach is that it requires digging a pit, lining the pit, waiting for the waste concrete material to dry, and loading and transporting the dry waste concrete material to another site. In some cases a number of pits need to be dug, during a construction project increasing the impact to the environment. Furthermore, spills can occur while dumping the wet concrete into the pit and washing out the residues, while the sheet material is subject to punctures and tearing, any of which can impact the environment. Consequently, the washing out of concrete equipment must be performed with careful regard for containing runoff from construction sites. As populations have grown and construction has crowded into new areas, building sites are increasingly being considered as possible threats to the environment.

Major concrete installations typically employ transit concrete mixing vehicles, also known as concrete mixers or trucks, to deliver loads of concrete from a concrete production facility to the construction site. The trucks have rotating drums that mix the concrete during transit, so that the concrete is thoroughly mixed and ready for dispensing when the truck reaches the site. After dispensing, a concrete residue remains on the discharge chutes, hoppers, and tools such as shovels and trowels used to handle, guide, and shape the concrete. To prevent the residue from hardening, these components are cleaned on site, typically by rinsing them with water. The resulting residue of this cleaning, i.e. concrete wash product, includes water, dissolved cementatious materials, suspended fine particulates, and larger aggregate. The water is highly alkaline due to the dissolved materials, and consequently is considered a potential groundwater contaminant. Thus, the previous practice of simply dumping concrete wash product onto the ground at the construction site is generally prohibited by local ordinance, state statutes, or regulations.

Mixed concrete and wet cement are frequently utilized in the construction industry either to form various concrete structures or to form both exterior and interior wall surfaces often referred to as stucco finish. These tasks are assisted by various tools and heavy machinery which at the end of its current use needs to be cleaned and prepared for its next use. These periodic washings are dictates by the very nature of concrete and it's very hard structure once set up. Simply, the hardened form of the substance requires that all the working surfaces of the machinery and tools by which it is worked need to be washed before the substance sets up. In the course of a large construction project these repeated washings produce substantial quantities of highly caustic liquid residue that then needs to be safely contained to limit any harm to the environment.

It should be appreciated that the proper disposal of washing fluids is no longer just a matter of good taste or good practice but is currently a subject of profound public concern and regulatory attention. Current damage to our environment is palpable and great public attention is now focused on any processes that either affect the pH of our waters or otherwise contaminate native chemistry balances. Of course, these concerns express themselves in regulatory enactments and enforcement consequences of these regulatory schemes, like the Clean Water Act, have recently resulted in several notoriously large penalty assessments.

Therefore, a need exists for an apparatus for facilitating concrete disposal that allows convenient emptying and cleaning of waste concrete from concrete mixing, hauling, and/or concrete application equipment without subjecting the environment to contamination hazards. The present invention satisfies those needs, as well as others, and overcomes the deficiencies of previously developed concrete disposal solutions.

SUMMARY OF THE INVENTION

A system for separating the water and solids from a volume of concrete washout is provided, which system comprises three containers in tandem, wherein the first container is adjacent to the second container, and the second container is adjacent to and shares a wall with the third container, wherein the first container includes an opening for receiving a volume of concrete washout from an external source and a spillway chute for transferring the washout into the second container, wherein the second container includes an opening for receiving the washout from the first container via the spillway chute, and further includes a plurality of weep holes positioned on the wall shared with the third container for transferring the washout into the third container, wherein the third container includes a discharge port for discharging the washout to the exterior.

Also provided is a system for separating the water and solids from a volume of concrete washout is provided, which system comprises four containers in tandem, wherein the first container is adjacent to the second container, and the second container is adjacent to and shares a wall with the third container, and the third container is adjacent to and shares a wall with the fourth container, wherein the first container includes an opening for receiving a volume of concrete washout from an external source and a spillway chute for transferring the washout into the second container, wherein the second container includes an opening for receiving the washout from the first container via the spillway chute, and further includes a plurality of weep holes positioned on the wall shared with the third container for transferring the washout into the third container, wherein the third container includes a plurality of weep holes positioned on the wall shared with the fourth container for transferring the washout into the fourth container, wherein the fourth container includes a discharge port for discharging the washout to the exterior.

Also provided is a method of separating the water and solids from a volume of concrete washout, which method comprises providing a volume of concrete washout, and delivering the washout into a first container, which first container includes an opening for receiving a volume of concrete washout from an external source and a spillway chute for transferring the washout into an adjacent second container, wherein the second container includes an opening for receiving the washout from the first container via the spillway chute, and further includes a plurality of weep holes positioned on a wall shared with an adjacent third container for transferring the washout into the third container, wherein the third container includes a discharge port for discharging the washout to the exterior.

Also provided is a method of separating the water and solids from a volume of concrete washout, which method comprises providing a volume of concrete washout, and delivering the washout into a first container, which first container includes an opening for receiving a volume of concrete washout from an external source and a spillway chute for transferring the washout into an adjacent second container, wherein the second container includes an opening for receiving the washout from the first container via the spillway chute, and further includes a plurality of weep holes positioned on a wall shared with an adjacent third container for transferring the washout into the third container, wherein the third container includes a plurality of weep holes positioned on a wall shared with an adjacent fourth container for transferring the washout into the fourth container, wherein the fourth container includes a discharge port for discharging the washout to the exterior.

BRIEF DESCRIPTION OF THE DRAWINGS

The following invention will be described with reference to the following drawings of which.

DETAILED DESCRIPTION

Figure 1:
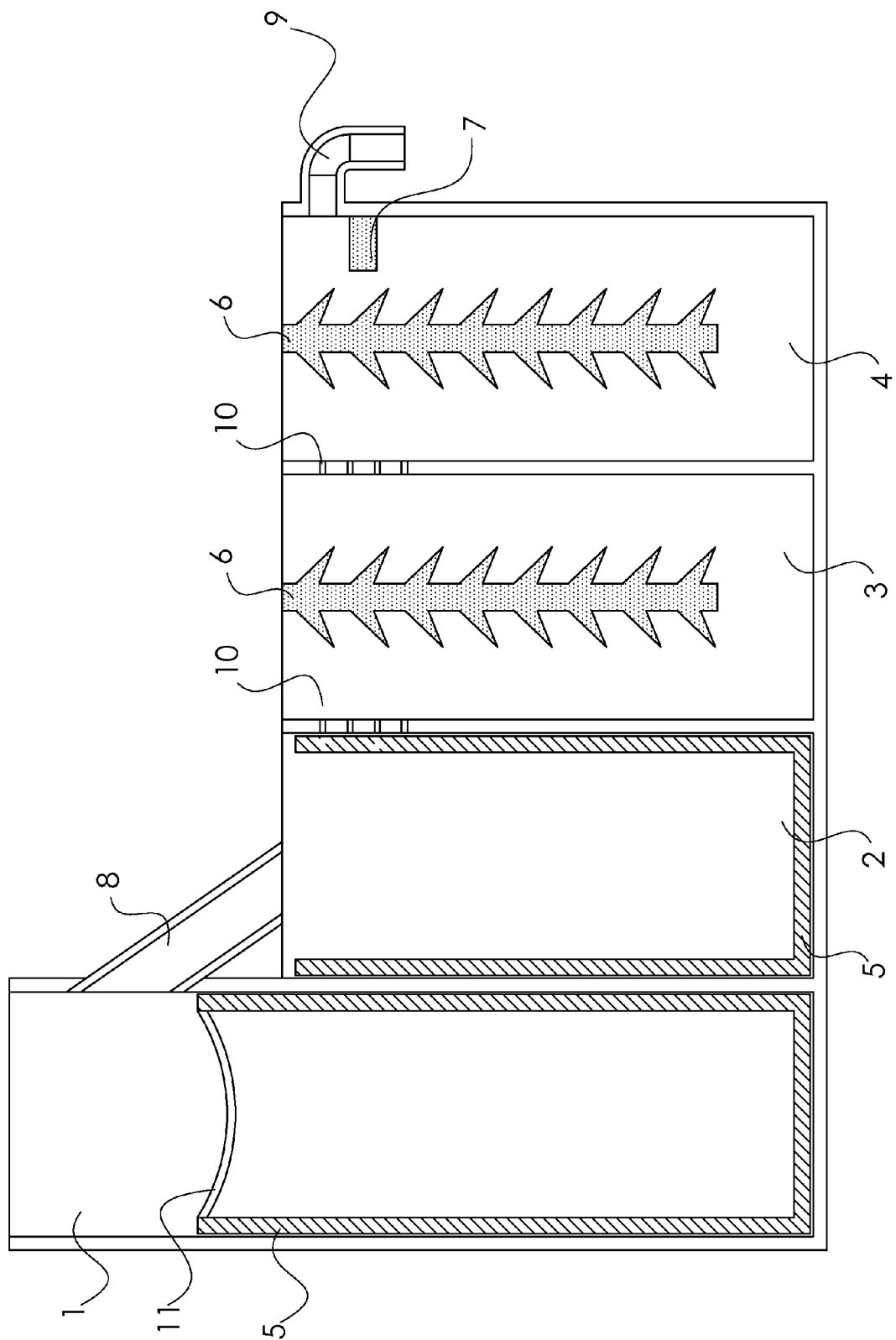
FIG. 1 illustrates a front view of an embodiment of an apparatus for separating the water and solids from a volume of concrete washout.

The invention disclosed herein will be described with respect to particular embodiments and with reference to certain drawings, but is not limited thereto. The drawings referenced are only schematic and are non-limiting. In the drawings, the size of some of the elements may be exaggerated or distorted and not drawn on scale for illustrative purposes. Where an indefinite or definite article is used when referring to a singular noun, e.g., "a" or "an," "the," this includes a plural of that noun unless something else is specifically stated.

Disclosed and described herein is a system for separating the water and solids from a volume of concrete washout, which system comprises three containers in tandem, wherein the first container is adjacent to the second container, and the second container is adjacent to and shares a wall with the third container, wherein the first container includes an opening for receiving a volume of concrete washout from an external source and a spillway chute for transferring the washout into the second container, wherein the second container includes an opening for receiving the washout from the first container via the spillway chute, and further includes a plurality of weep holes positioned on the wall shared with the third container for transferring the washout into the third container, wherein the third container includes a discharge port for discharging the washout to the exterior. Preferably at least one of the first, second, and third containers is lined with a liner comprising a semi-permeable material permitting diffusion of water but not solids; more preferably, the first container and second container are lined with such a liner. The liner can be removable with respect to the container, and can include one or more straps or means for securing the liner onto or into the container and for removing it from the container. The liner can be reusable or disposable. Preferably, the third container includes a floating pump for pumping out via the discharge port the washout to the exterior. At least one of the second and third containers can include a baffle to direct incoming washout downward; such baffles can be detachable with respect to the container. The second and third containers can be covered to prevent them from accidentally receiving direct concrete washout. The first, second, and third containers can be made of steel, aluminum, or another suitable metal or allow thereof, and even plastic or another suitable polymer.

Also disclosed and described herein is a system for separating the water and solids from a volume of concrete washout, which system comprises four containers in tandem, wherein the first container is adjacent to the second container, wherein the second container is adjacent to and shares a wall with the third container, and wherein the third container is adjacent to and shares a wall with the fourth container, wherein the first container includes an opening for receiving a volume of concrete washout from an external source and a spillway chute for transferring the washout into the second container, wherein the second container includes an opening for receiving the washout from the first container via the spillway chute, and further includes a plurality of weep holes positioned on the wall shared with the third container for transferring the washout into the third container, wherein the third container includes a plurality of weep holes positioned on the wall shared with the fourth container for transferring the washout into the fourth container, wherein the fourth container includes a discharge port for discharging the washout to the exterior. Preferably at least one of the first, second, third, and fourth containers is lined with a liner comprising a semi-permeable material permitting diffusion of water but not solids; more preferably, the first container and second container are lined with such a liner. The liner can be removable with respect to the container, and can include one or more straps or means for securing the liner onto or into the container and for removing it from the container. The liner can be reusable or disposable. Preferably, the fourth container includes a floating pump for pumping out via the discharge port the washout to the exterior. At least one of the second, third, and fourth containers can include a baffle to direct incoming washout downward; such baffles can be detachable with respect to the container. The second, third, and fourth containers can be covered to prevent them from accidentally receiving direct concrete washout. The first, second, third, and fourth containers can be made of steel, aluminum, or another suitable metal or allow thereof, and even plastic or another suitable polymer.

Also disclosed and described herein is a method of separating the water and solids from a volume of concrete washout, which method comprises providing a volume of concrete washout, and delivering the washout into a first container, which first container includes an opening for receiving a volume of concrete washout from an external source and a spillway chute for transferring the washout into an adjacent second container, wherein the second container includes an opening for receiving the washout from the first container via the spillway chute, and further includes a plurality of weep holes positioned on a wall shared with an adjacent third container for transferring the washout into the third container, wherein the third container includes a discharge port for discharging the washout to the exterior. Preferably at least one of the first, second, and third containers is lined with a liner comprising a semi-permeable material permitting diffusion of water but not solids; more preferably, only the first container and second container are lined with such a liner. The liner can be removable with respect to the container, and can include one or more straps or means for securing the liner onto or into the container and for removing it from the container. The liner can be reusable or disposable. Preferably, the third container includes a floating pump for pumping out via the discharge port the washout to the exterior. At least one of the second and third containers can include a baffle to direct incoming washout downward; such baffles can be detachable with respect to the container. The second and third containers can be covered to prevent them from accidentally receiving direct concrete washout. The first, second, and third containers can be made of steel, aluminum, or another suitable metal or allow thereof, and even plastic or another suitable polymer.

Also disclosed and described herein is a method of separating the water and solids from a volume of concrete washout, which method comprises providing a volume of concrete washout, and delivering the washout into a first container, which first container includes an opening for receiving a volume of concrete washout from an external source and a spillway chute for transferring the washout into an adjacent second container, wherein the second container includes an opening for receiving the washout from the first container via the spillway chute, and further includes a plurality of weep holes positioned on a wall shared with an adjacent third container for transferring the washout into the third container, wherein the third container includes a plurality of weep holes positioned on a wall shared with an adjacent fourth container, wherein the fourth container includes a discharge port for discharging the washout to the exterior, and wherein at least one of the first, second, third, and fourth containers includes one or more baffles to direct incoming washout downward. Preferably at least one of the first, second, third, and fourth containers is lined with a liner comprising a semi-permeable material permitting diffusion of water but not solids; more preferably, only the first container and second container are lined with such a liner. The liner can be removable with respect to the container, and can include one or more straps or means for securing the liner onto or into the container and for removing it from the container. The liner can be reusable or disposable. Preferably, the fourth container includes a floating pump for pumping out via the discharge port the washout to the exterior. At least one of the second, third, and fourth containers can include a baffle to direct incoming washout downward; such baffles can be detachable with respect to the container. The second, third, and fourth containers can be covered to prevent them from accidentally receiving direct concrete washout. The first, second, third, and fourth containers can be made of steel, aluminum, or another suitable metal or allow thereof, and even plastic or another suitable polymer.

Figure 2:
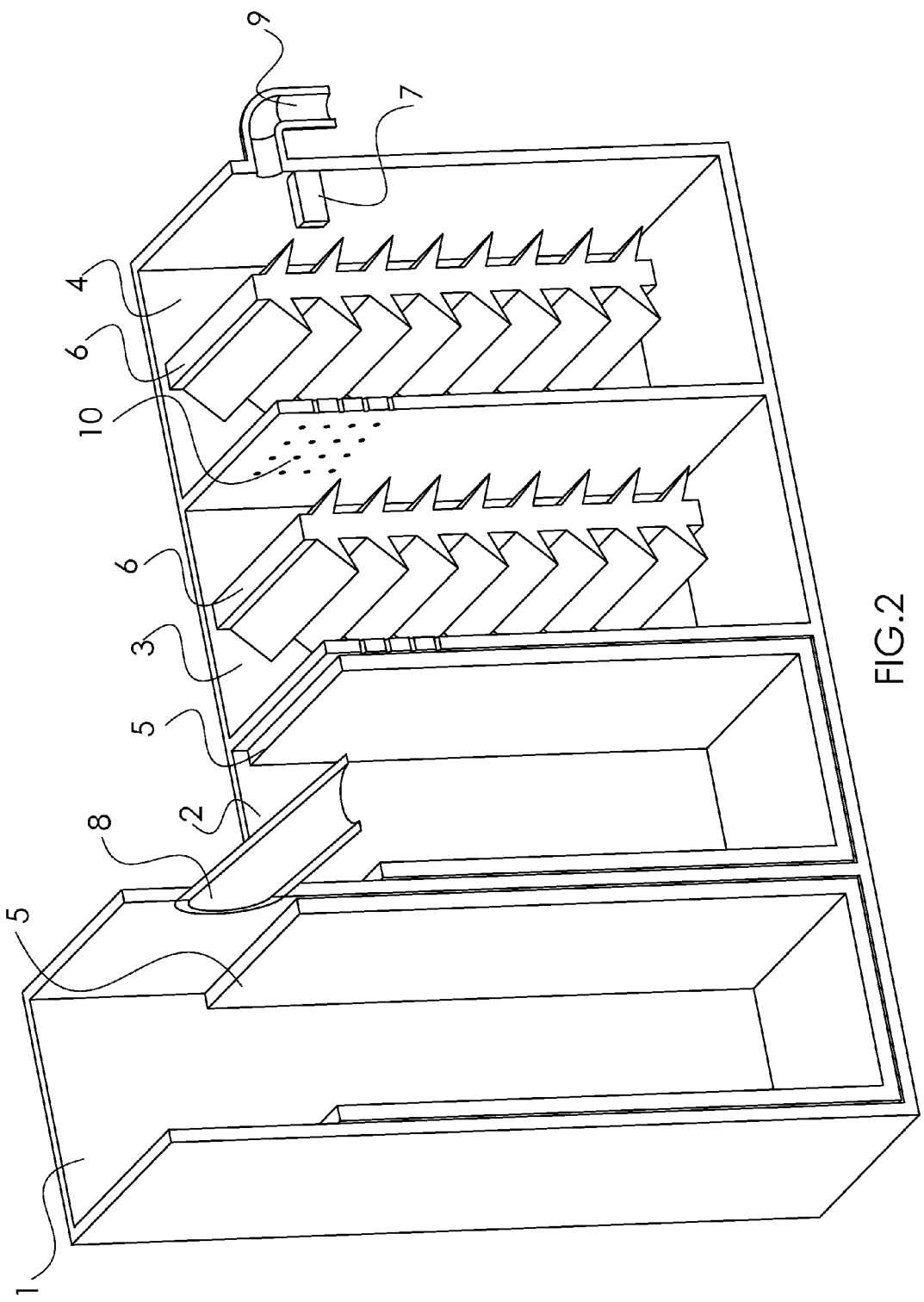
FIG. 2 illustrates a perspective view of an embodiment of an apparatus for separating the water and solids from a volume of concrete washout.

Referring to FIGS. 1 and 2, one embodiment of the apparatus described herein is shown, which apparatus comprises a first container 1, a second container 2, a third container 3, and a fourth container 4. The second container 2 is positioned next to the first container 1. The third container 3 is positioned adjacent to and shares a wall with the second container 2. The fourth container 4 is positioned adjacent to and shares a wall with the third container. The first container 1 and second container 2 is lined with a liner 5 made of a semi-permeable material permitting diffusion of water but not solids. The liner 5 may include one or more straps 11 to enable it to be efficiently placed into the container and to be removed from the container. The third container 3 and the fourth container 4 may include a baffle 6, which baffle may extend from the top of the container substantially, but not entirely, to the bottom of the container. The shared wall of the second container 2 and the third container 3, and the third container 3 and the fourth container 4, include a plurality of weep holes 10 located near the top of the container. The top of the first container 1 is higher than the top of each of the second container 2, third container 3, and fourth container 4, which are the same or substantially the same height.

In operation the first container 1 with liner 5 receives the concrete washout, which includes a mixture of water and the concrete waste. Once the washout in the first container 1 reaches a certain level, it is gradually transferred to the second container 2 with liner 5 via a spillway chute 8. Once the washout in the second container 2 reaches a certain level, it is transferred to the third container 3 via the plurality of weep holes 10. The baffle 6 in the third container 3 forces the incoming washout downward, causing settling of residual solids in the washout at the bottom of the container. Once the washout in the third container 3 reaches a certain level, it is transferred to the fourth container 4 via the plurality of weep holes 10. The baffle 6 in the fourth container 4 forces the incoming washout downward, causing settling of residual solids in the washout at the bottom of the container. The washout resulting on the side of the baffle 6 in the fourth container 4 opposite the weep holes 10 will by this point be substantially, if not entirely, free of solids, and can be safely disposed of with no harmful environmental effects, or even recycled for use in further washout procedures. To assist in possible recycling, a floating pump 7 powered by a gas engine or electrical motor can be placed inside the fourth container 4 to enable the washout therein to be pumped out via a discharge port 9.

Although discussion herein generally refers to concrete waste and concrete fluid washout material, the use of the apparatus described herein is not to be considered restrictive to concrete fluid waste material, but can also readily be used to control overflow of other mixtures of liquid waste material and fluid contaminates. The scope of the invention is related to an environmentally friendly means of generally addressing overflow of all types of fluid waste material and removing same from washout type containers.

Although the foregoing has been illustrated and described with respect to one or more embodiments, equivalent alterations and modifications will occur to others skilled in the art upon the reading and understanding of this specification and the annexed drawings. In addition, while a particular feature may have been disclosed with respect to only one of several embodiments, such feature may be combined with one or more other features of the other embodiments as may be desired and advantageous for any given or particular application.

With respect to the above description then, it is to be realized that the optimum dimensional relationships, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

Therefore, the foregoing is considered as illustrative only of the principles of the invention described herein. Further, since numerous modifications and changes will readily occur to those skilled in the art, it is not desired to limit the invention to the exact construction and operation shown and described, and accordingly, all suitable modifications and equivalents may be resorted to, falling within their scope.

The Abstract of the disclosure will allow the reader to quickly ascertain the nature of the disclosure. It is submitted with the understanding that it will not be used to interpret or limit the scope or meaning of the following claims.

What is claimed is:

1. A system for separating the water and solids from a volume of concrete washout is provided, which system comprises four containers in tandem, wherein the first container is adjacent to the second container, and the second container is adjacent to and shares a wall with the third container, and the third container is adjacent to and shares a wall with the fourth container, wherein the first container includes an opening for receiving a volume of concrete washout from an external source and a spillway chute for transferring the washout into the second container, wherein the second container includes an opening for receiving the washout from the first container via the spillway chute, and further includes a plurality of weep holes positioned on the wall shared with the third container for transferring the washout into the third container, wherein the third container includes a plurality of weep holes positioned on the wall shared with the fourth container for transferring the washout into the fourth container, wherein the fourth container includes a discharge port for discharging the washout to the exterior.

2. A system for separating the water and solids from a volume of concrete washout is provided, which system comprises three containers in tandem, wherein the first container is adjacent to the second container, and the second container is adjacent to and shares a wall with the third container, wherein the first container includes an opening for receiving a volume of concrete washout from an external source and a spillway chute for transferring the washout into the second container, wherein the second container includes an opening for receiving the washout from the first container via the spillway chute, and further includes a plurality of weep holes positioned on the wall shared with the third container for transferring the washout into the third container, wherein the third container includes a discharge port for discharging the washout to the exterior.

3. A method of separating the water and solids from a volume of concrete washout, which method comprises providing a volume of concrete washout, and delivering the washout into a first container, which first container includes an opening for receiving a volume of concrete washout from an external source and a spillway chute for transferring the washout into an adjacent second container, wherein the second container includes an opening for receiving the washout from the first container via the spillway chute, and further includes a plurality of weep holes positioned on a wall shared with an adjacent third container for transferring the washout into the third container, wherein the third container includes a plurality of weep holes positioned on a wall shared with an adjacent fourth container for transferring the washout into the fourth container, wherein the fourth container includes a discharge port for discharging the washout to the exterior.

* * * * *